United States Patent
Dai et al.

(10) Patent No.: US 10,786,338 B2
(45) Date of Patent: Sep. 29, 2020

(54) FIXING STRUCTURE FOR USE IN DRIVER APPARATUS OF ELECTRIC CLEANING APPLIANCE

(71) Applicant: SHANGHAI SHIFT ELECTRICS CO., LTD., Shanghai (CN)

(72) Inventors: Xiaoguo Dai, Shanghai (CN); Zhenwu Xu, Shanghai (CN)

(73) Assignee: Shanghai Shift Electrics Co., Ltd., Shanghai (CN)

(*) Notice: Subject to any disclaimer, the term of this patent is extended or adjusted under 35 U.S.C. 154(b) by 3 days.

(21) Appl. No.: 16/314,231

(22) PCT Filed: Jul. 7, 2016

(86) PCT No.: PCT/CN2016/089090
§ 371 (c)(1),
(2) Date: Dec. 28, 2018

(87) PCT Pub. No.: WO2018/000448
PCT Pub. Date: Jan. 4, 2018

(65) Prior Publication Data
US 2019/0239993 A1    Aug. 8, 2019

(30) Foreign Application Priority Data
Jun. 30, 2016    (CN) .......................... 2016 1 0510313

(51) Int. Cl.
*A61C 17/22* (2006.01)
*H02K 33/18* (2006.01)
*A61C 17/26* (2006.01)

(52) U.S. Cl.
CPC ............ *A61C 17/225* (2013.01); *A61C 17/22* (2013.01); *A61C 17/222* (2013.01); *A61C 17/26* (2013.01);
(Continued)

(58) Field of Classification Search
CPC ...... A61C 17/225; A61C 17/22; A61C 17/222; A61C 17/26; A46B 2200/1066;
(Continued)

(56) References Cited

U.S. PATENT DOCUMENTS

| | | | | |
|---|---|---|---|---|
| 2011/0239383 A1* | 10/2011 | Nishiura | ............ | A61C 17/3445 15/22.1 |
| 2014/0096332 A1* | 4/2014 | Kitagawa | ............ | A61C 17/3481 15/22.1 |
| 2016/0000543 A1* | 1/2016 | Kobayashi | ............. | A61C 17/34 15/22.1 |

FOREIGN PATENT DOCUMENTS

| | | |
|---|---|---|
| CN | 103547234 A | 1/2014 |
| CN | 203539472 U | 4/2014 |

(Continued)

OTHER PUBLICATIONS

International Patent Application No. PCT/CN2016/089090; Int'l Search Report; dated Mar. 30, 2017; 3 pages.

*Primary Examiner* — Michael Andrews
(74) *Attorney, Agent, or Firm* — BakerHostetler

(57) ABSTRACT

The invention relates to a fixing structure for use in a driver apparatus of an electric cleaning appliance. The driver apparatus comprises a transducer assembly and a drive coil assembly within a handle housing. The transducer assembly comprises a transducer, a transducer frame and a transducer assembly fixing member. The drive coil assembly comprises a drive coil, a drive coil frame and a drive coil assembly fixing member. The transducer frame and the drive coil frame respectively comprise left and right frames disposed separate from each other. The handle housing is respectively fastened with the transducer assembly or the drive coil assembly via a first or second structural feature part in a way that one cannot move relative to the other. The transducer assembly and the drive coil assembly are connected via a (Continued)

third structural feature part in a way that one can move relative to the other.

20 Claims, 12 Drawing Sheets

(52) U.S. Cl.
CPC ...... *H02K 33/18* (2013.01); *A46B 2200/1066* (2013.01)

(58) Field of Classification Search
CPC ........ H02K 33/02; H02K 33/04; H02K 33/06; H02K 35/02
USPC .................................. 310/15, 20, 21, 28, 38
See application file for complete search history.

(56) References Cited

FOREIGN PATENT DOCUMENTS

| | | |
|---|---|---|
| CN | 203827150 U | 9/2014 |
| CN | 104617704 A | 5/2015 |
| CN | 104617732 A | 5/2015 |
| JP | 2003-210494 A | 7/2003 |
| WO | WO 2010/055641 A1 | 5/2010 |

* cited by examiner

FIXING STRUCTURE FOR USE IN DRIVER APPARATUS OF ELECTRIC CLEANING APPLIANCE

CROSS-REFERENCE TO RELATED APPLICATIONS

This application is a U.S. national stage application of International Patent Application No. PCT/CN2016/089090, filed on Jul. 7, 2016, which claims priority to Chinese patent application number 201610510313.0, filed on Jun. 30, 2016, the disclosure of which is incorporated herein by reference in its entirety.

TECHNICAL FIELD

The invention relates to a fixing structure for use in a driver apparatus of an electric cleaning appliance, and in particular, to a fixing structure for use in a driver apparatus of an electric cleaning appliance such as an electric toothbrush, an electric shaver, an electric face cleanser, an electric shower and the like.

BACKGROUND

In the Chinese patent application No. 201510042433.8 filed by the applicant, there is disclosed an appliance for personal cleaning and care, which comprises a handle and a cleaning assembly detachably connected to a drive shaft. The handle comprises a handle housing, and inside the handle housing are installed a power supply portion, a control portion, a trigger portion, and a driver for converting input electric energy into a mechanical energy output. The driver comprises a transducer, a drive coil, a drive coil iron core disposed in the drive coil, and a driver bracket for supporting the driver. The transducer comprises the drive shaft inserted into the cleaning assembly, a transducer elastic element retainer fastened to the driver, permanent magnets arranged on left and right sides with respect to the longitudinal axis of the drive shaft, permanent magnet brackets for fixedly connecting the permanent magnets, transducer transmission arms fixedly connected to the permanent magnet brackets and to the drive shaft, and transducer elastic elements disposed on the left and right sides of the longitudinal axis of the drive shaft.

For an electric cleaning appliance of the above-mentioned type, the cleaning element often exhibits high-speed reciprocating motion. To realize the high-speed reciprocating motion of the cleaning element, it must have a sufficient moment of force, so as to remain in the high-speed reciprocating motion state in a load state. When the driver apparatus installed inside the handle housing provides a drive moment of force to the cleaning element to cause the cleaning element to move at a high speed, a user can often feel the vibration on the handle housing, and the higher the drive moment of force on the cleaning element, the larger the vibration on the handle housing is.

To compensate for and/or reduce the vibration generated by the operation of the primary resonator, CN101801308B discloses a vibration-canceling secondary resonator for use in a personal care appliance, which comprises a handle portion, a workpiece assembly, a motor assembly of the primary resonator installed on the handle and used for driving the workpiece assembly, and a secondary resonator connected to the motor assembly or the handle portion. The secondary resonator comprises a spring mass assembly, wherein when the appliance is in operation, the resonant frequency and operation of the spring mass assembly cause a reduction in vibration from the motor assembly to the handle portion.

SUMMARY

The task of the invention is to provide a fixing structure for use in a driver apparatus of an electric cleaning appliance, which utilizes a reasonable configuration of existing parts to reduce the vibration of the handle housing without increasing the number of parts. The electric cleaning appliance of the invention comprises a handle comprising a handle housing in which a power supply portion for supplying power to respective portions of the cleaning appliance, a control portion for controlling the various operation modes of the electric cleaning appliance and opening or closing the cleaning appliance, a trigger portion for turning on or off the operation of the cleaning appliance and a driver apparatus for converting input electric energy into a mechanical energy output. The driver apparatus is disposed within the handle housing. The driver apparatus comprises a transducer assembly and a drive coil assembly. The transducer assembly comprises a transducer, a transducer frame and a transducer assembly fixing part. The drive coil assembly comprising a drive coil, a drive coil frame and a drive coil assembly fixing part. The transducer comprises a transducer drive shaft inserted into a cleaning assembly, at least one transducer elastic member, at least one transducer elastic member fixing member for fastening the transducer elastic member and at least two permanent magnets. The polarities of the magnetic poles of the permanent magnets in a direction toward the drive coil are opposite, the permanent magnets can move either relative to the transducer elastic member fixing member or relative to the drive coil. When an alternating current with a frequency of f0 passes through the drive coil, an electromagnetic force generated between the permanent magnets and the drive coil with the alternating current at frequency f0 drives the transducer to resonate. The transducer frame comprises left and right frames of the transducer which are disposed separately from each other, and the transducer and the left and right frames of the transducer are fixedly connected with each other. The drive coil frame comprises left and right frames of the drive coil which are disposed separately from each other, the drive coil and the left and right frames of the drive coil are fixedly connected with each other, on the drive coil left frame and the drive coil right frame are respectively arranged a drive coil left frame hollow area and a drive coil right frame hollow area, and the drive coil left frame hollow area and the drive coil right frame hollow area allow a moving component in the transducer to rotate back and forth without interference around the longitudinal axis of the transducer drive shaft or a straight line approximately parallel to the longitudinal axis of the transducer drive shaft in the drive coil assembly. The handle housing is fastened with the transducer assembly via a first structural feature part in a way that one cannot move relative to the other, the handle housing is fastened with the drive coil assembly via a second structural feature part in a way that one cannot move relative to the other. The transducer assembly and the drive coil assembly are connected via a third structural feature part in a way that one can move relative to the other, in contact facing each other or separately.

Preferably, the first structural feature part is at least one mating surface which is respectively disposed on the transducer left frame and/or the transducer right frame and forms an angle with the longitudinal axis L1 of the transducer drive shaft, and mating surfaces correspondingly disposed on the handle housing along the direction of the longitudinal axis L1 of the transducer drive shaft and mating therewith.

The second structural feature part may also be at least one mating surface which is respectively disposed on the drive coil left frame and/or the drive coil right frame and forms an angle with the longitudinal axis L1 of the transducer drive shaft, and mating surfaces correspondingly disposed on the handle housing along the direction of the longitudinal axis L1 of the transducer drive shaft and mating therewith.

Preferably, the third structural feature part is at least one mating surface which is respectively arranged close to the top of the brush head along the longitudinal axis L1 of the transducer drive shaft on the left and right frames of the drive coil, and mating surfaces disposed on the left and right frames of the transducer and mating therewith.

The transducer left frame and the transducer right frame may be disposed symmetrically and separately. The drive coil left frame and the drive coil right frame may also be disposed symmetrically and separately.

Preferably, the angle formed between the mating surface and the longitudinal axis of the transducer drive shaft is greater than −45° and less than 45°. More preferably, the angle is greater than −5° and less than 5°.

Preferably, the mating surfaces are planes.

Since this invention reduces the vibration of the handle by a reasonable configuration of existing parts without increasing the number of parts, the invention has advantages of low cost, simple process and small volume. By utilizing the fixing structure of the invention, the vibration on the handle housing may be effectively reduced.

EXPLANATION OF MAIN REFERENCE NUMERALS

Figure 1:
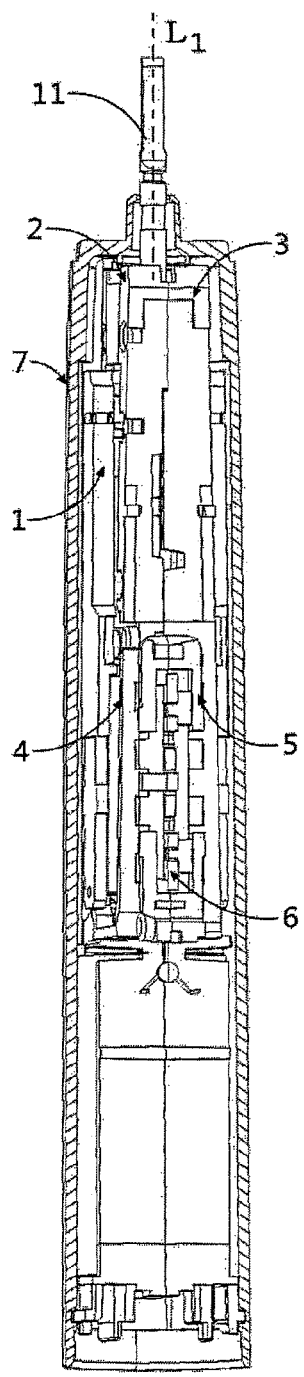
FIG. 1 is a partial cross-sectional view of an embodiment of a driver apparatus according to the invention, which shows an assembly relationship of the handle housing, the transducer assembly and the drive coil assembly.
Figure 2:
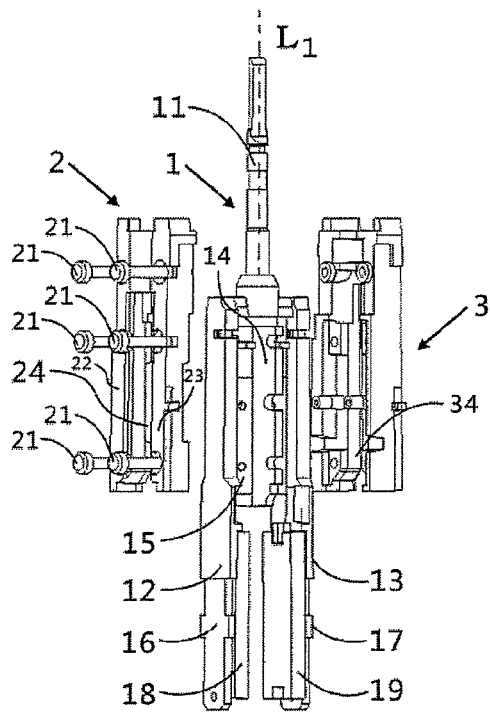
FIG. 2 is a schematic exploded view of the transducer assembly as shown in FIG. 1.
Figure 3:
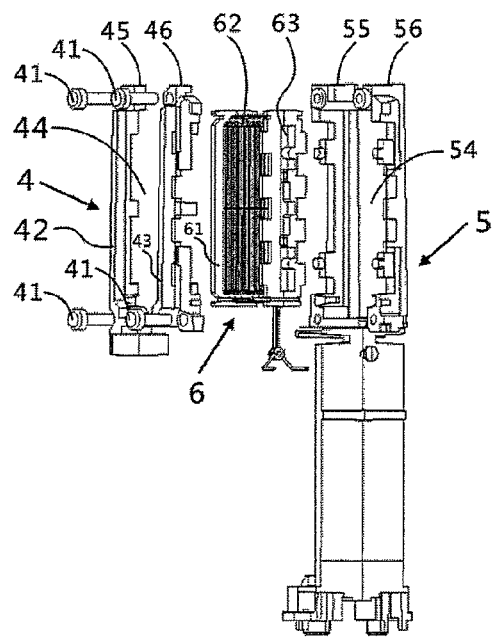
FIG. 3 is a schematic exploded view of the drive coil assembly as shown in FIG. 1.
Figure 4:
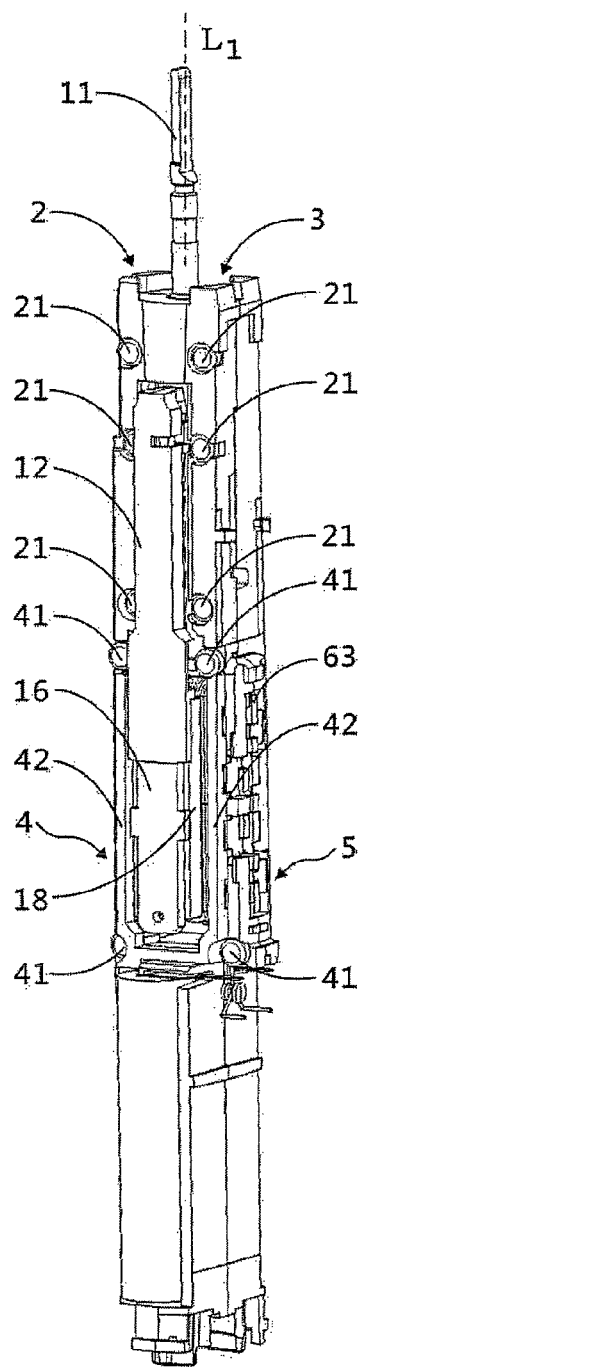
FIG. 4 is an assembly diagram of the drive coil assembly and the transducer assembly.

1 Transducer
2 Transducer left frame
3 Transducer right frame
4 Drive coil left frame
5 Drive coil right frame
6 Drive coil
7 Handle housing
8 Driver apparatus left frame in the second comparative example
9 Driver apparatus right frame in the second comparative example
11 Transducer drive shaft
12 Transducer left transmission arm
13 Transducer right transmission arm
14 Transducer elastic member fixing member
15 Transducer elastic member
16 Transducer left permanent magnet frame
17 Transducer right permanent magnet frame
18 Transducer left permanent magnet
19 Transducer right permanent magnet
21 Transducer assembly fixing member
22 First mating surface of the transducer left frame
23 Second mating surface of the transducer left frame
24 Transducer left frame hollow area
25 Third mating surface of the transducer left frame
26 Fourth mating surface of the transducer left frame
32 First mating surface of the transducer right frame
33 Second mating surface of the transducer right frame
34 Transducer right frame hollow area
35 Third mating surface of the transducer right frame
36 Fourth mating surface of the transducer right frame
41 Drive coil assembly fixing member
42 First mating surface of the drive coil left frame
43 Second mating surface of the drive coil left frame
44 Drive coil left frame hollow area
45 Third mating surface of the drive coil left frame
46 Fourth mating surface of the drive coil left frame
52 First mating surface of the drive coil right frame
53 Second mating surface of the drive coil right frame
54 Drive coil right frame hollow area
55 Third mating surface of the drive coil right frame
56 Fourth mating surface of the drive coil right frame
61 Drive coil rack
62 Drive coil winding
63 Drive coil iron core
71 First mating surface of the handle housing
72 Second mating surface of the handle housing
73 Third mating surface of the handle housing
74 Fourth mating surface of the handle housing
75 Fifth mating surface of the handle housing
76 Sixth mating surface of the handle housing
77 Seventh mating surface of the handle housing
78 Eighth mating surface of the handle housing
81 Driver apparatus fixing member in the second comparative example 82 First mating surface of the driver apparatus left frame in the second comparative example
83 Second mating surface of the driver apparatus left frame in the second comparative example
84 Third mating surface of the driver apparatus left frame in the second comparative example
85 Fourth mating surface of the driver apparatus left frame in the second comparative example
92 First mating surface of the driver apparatus right frame in the second comparative example
93 Second mating surface of the driver apparatus right frame in the second comparative example
94 Third mating surface of the driver apparatus right frame in the second comparative example
95 Fourth mating surface of the driver apparatus right frame in the second comparative example
$L_1$ Longitudinal axis of the transducer drive shaft
$M_4$ Torque of the elastic member fixing member
$M_5$ Torque of the drive coil.

DETAILED DESCRIPTION

In the following, exemplary embodiments of the invention will be described in more detail with an electric toothbrush as an example and in conjunction with the drawings. As described above, although only an electric toothbrush is taken as an example for explanation in the following, the invention is not limited thereto. The invention may also be applied to an electric shaver, an electric face cleanser, an electric shower, and the like.

In all the drawings, like reference signs denote like parts.

For the sake of clarity, in the specification, words such as "left", "right", etc. which formulate spatially relative positions are employed to simply describe the mutual relationship between one element or feature and another element (one or more) or feature (one or more) as shown, wherein "left" and "right" are mentioned with respect to the longitudinal axis of the transducer drive shaft, and facing a corresponding view, the left side of the longitudinal axis of the drive shaft along a direction perpendicular to the longitudinal axis of the drive shaft is defined as "left", and the right side thereof is defined as "right".

In addition, the term "and/or" used in the application comprises any one and all the combinations of one or more listed related terms.

Although words "first", "second", "third", etc. are used in the specification to describe multiple elements or constituent parts, these elements or constituent parts should not be limited by the words. These words are only used for distinguishing one element or constituent part from another element or constituent part, and do not comprise "ordering". Therefore, exchange of the ordinal numbers of those elements or constituent parts discussed in the following will not fall outside the concept and scope of the invention.

As an example, as shown in FIG. 1 to FIG. 4, a cleaning appliance such as an electric toothbrush comprises a handle and a cleaning assembly (not shown in the figures) detachably installed on the handle. The handle comprises a handle housing 7, a transducer assembly, a drive coil assembly, a control circuit board (not shown), a battery (not shown), etc. The transducer assembly comprises a transducer 1, left and right frames 2 and 3 of the transducer which are separately disposed, and a transducer assembly fixing member 21. The drive coil assembly comprises a drive coil 6, a left and right frames 4 and 5 of the drive coil which are separately disposed, and a drive coil assembly fixing member 41. In this specification, the transducer left frame 2 and the transducer right frame 3 which are combined together are collectively called a transducer rack, and the drive coil left frame 4 and the drive coil right frame 5 which are combined together are collectively called a drive coil rack. The cleaning appliance is powered by the battery placed inside the handle housing 7, an alternating voltage is applied on the drive coil 6 by the control circuit board in a specific way, an alternating current flows through the drive coil 6, and the drive coil 6 through which the alternating current flows interacts with the transducer 1, thereby realizing that the transducer drive shaft 11 rotates back and forth around the longitudinal axis $L_1$ of the transducer drive shaft or a straight line approximately parallel to the longitudinal axis $L_1$ of the transducer drive shaft ("approximately parallel" to means the angle between two straight lines is not greater than 20 degrees), thereby driving a brush head connected to the transducer drive shaft 11 to rotate back and forth around the longitudinal axis $L_1$ of the transducer drive shaft or a straight line approximately parallel to the longitudinal axis $L_1$ of the transducer drive shaft, and in turn realizing reciprocating motion of the cleaning element on the brush head and achieving the cleaning effect.

Preferably, the left and right frames 2, 3 of the transducer are disposed separately, and the left and right frames 4, 5 of the drive coil are disposed separately. More preferably, the left and right frames 2, 3 of the transducer are disposed separately and symmetrically with respect to each other, and the left and right frames 4, 5 of the drive coil are disposed separately and symmetrically with respect to each other.

As shown in FIG. 2, FIG. 5, FIG. 7, FIG. 9, and FIG. 11, the transducer 1 comprises the transducer drive shaft 11, a transducer left transmission arm 12, a transducer right transmission arm 13, a transducer elastic member fixing member 14, a transducer elastic member 15, a transducer left permanent magnet frame 16, a transducer right permanent magnet frame 17, a transducer left permanent magnet 18, and a transducer right permanent magnet 19. The above various parts of the transducer are fixedly connected together and constitute the transducer 1. The transducer 1 and the left and right frames 2, 3 of the transducer are fixedly connected together via a transducer assembly fixing member 21 and constitute the transducer assembly. On the transducer left frame 2 is arranged a transducer left frame hollow area 24, and on the transducer right frame 3 is arranged a transducer right frame hollow area 34. In the transducer assembly, the transducer left transmission arm 12 and the transducer right transmission arm 13 pass through the transducer left frame hollow area 24 and the transducer right frame hollow area 34, respectively, and the transducer left frame hollow area 24 and the transducer right frame hollow area 34 allow a moving component in the transducer 1 to rotate back and forth without interference around the longitudinal axis L1 of the transducer drive shaft in the transducer assembly. The shape of the transducer elastic member fixing member 14 is for example approximate to a cuboid, corresponding shapes or forms are arranged on the transducer left frame 2 and the transducer right frame 3 to accommodate the transducer elastic member fixing member 14, and the left and right frames 2 and 3 of the transducer and the transducer elastic member fixing member 14 are fastened with each other via the transducer assembly fixing member 21, that is, the left and right frames 2 and 3 of the transducer and the transducer elastic member fixing member 14 are fixedly connected together without relative motion. The transducer elastic member fixing member 14 is in contact with the transducer left frame 2 and the transducer right frame 3, respectively. And the handle housing 7 and the transducer assembly are fastened via a first structural feature part in a way that one cannot move relative to the other. The first structural feature part is at least one mating surface 22, 23, 32, 33 which is respectively disposed on the transducer left frame 2 and/or the transducer right frame 3 and forms an angle with the longitudinal axis L1 of the transducer drive shaft, and mating surfaces 71-74 correspondingly disposed on the handle housing 7 along the direction of the longitudinal axis L1 of the transducer drive shaft and mating therewith.

As shown in FIG. 3, FIG. 6, FIG. 8, FIG. 10, and FIG. 11, the drive coil 6 comprises a drive coil rack 61, a drive coil winding 62, and a drive coil iron core 63. The drive coil iron core 63 is inserted into a hollow area of the drive coil rack 61, and the drive coil winding 62 is composed of an enameled wire wrapped around the drive coil iron core 63. The drive coil 6 and the left and right frames 4, 5 of the drive coil are fixedly connected together via a drive coil assembly fixing member 41 and constitute the drive coil assembly. On the drive coil left frame 4 is arranged a drive coil left frame hollow area 44, and on the drive coil right frame 5 is arranged a drive coil right frame hollow area 54. The left and right frame hollow areas 44 and 54 of the drive coil allow a moving component in the transducer 1 to rotate back and forth without interference around the longitudinal axis L1 of the transducer drive shaft in the drive coil assembly. On the left and right frames 4, 5 of the drive coil are respectively arranged shapes or forms for accommodating the drive coil rack 61. The left and right frames 4, 5 of the drive coil and the drive coil 6 are fastened with each other via the drive coil assembly fixing member 41, that is, the three are fixedly connected together without relative motion. The drive coil rack 61 is in contact with the left and right frames 4, 5 of the drive coil, respectively. And the handle housing 7 and the drive coil assembly are fastened via a second structural feature part in a way that one cannot move relative to the other. The second structural feature part is at least one mating surface 42, 43, 52, 53 which is respectively disposed on the drive coil left frame 4 and/or the drive coil right frame 5 and forms an angle with the longitudinal axis L1 of the transducer drive shaft, and mating surfaces 75-78 correspondingly disposed on the handle housing 7 along the direction of the longitudinal axis L1 of the transducer drive shaft and mating therewith.

Figure 5:
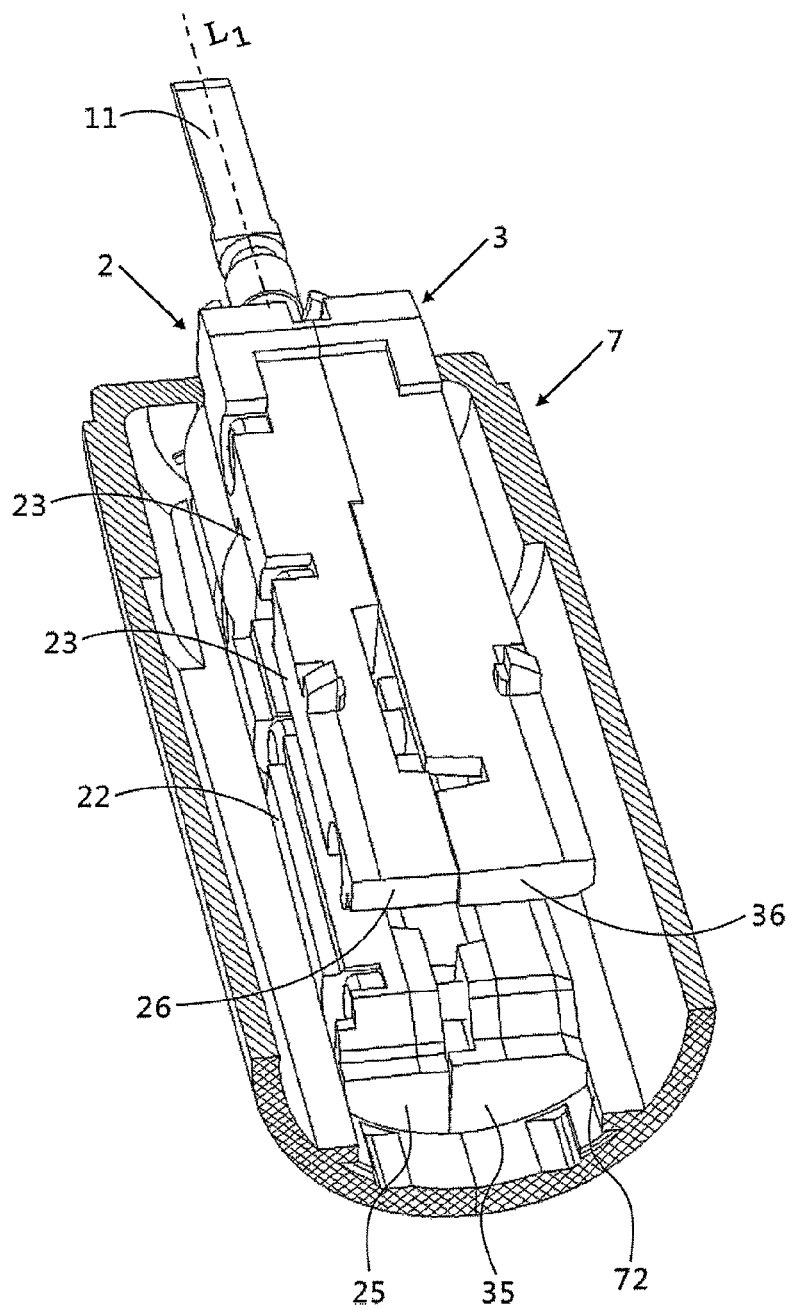
FIG. 5 illustrates in a partial cross-sectional view an assembly relationship of the handle housing and the transducer assembly in which the transducer is hidden.

As shown in FIG. 5, on an end of the transducer left frame 2 away from the brush head along the longitudinal axis $L_1$ of the transducer drive shaft are arranged a third mating surface 25 of the transducer left frame and a fourth mating surface 26 of the transducer left frame. On an end of the transducer right frame 3 away from the brush head along the longitudinal axis $L_1$ of the transducer drive shaft are arranged a third mating surface 35 of the transducer right frame and a fourth mating surface 36 of the transducer right frame.

Figure 6:
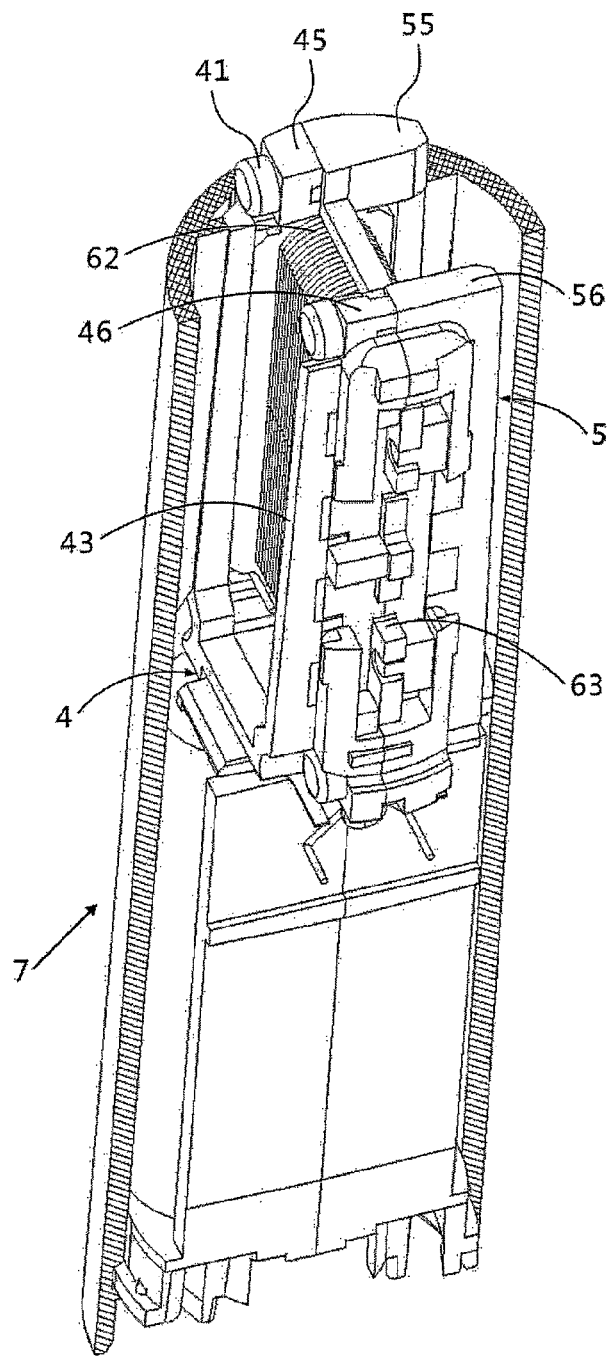
FIG. 6 illustrates in a partial cross-sectional view an assembly relationship of the handle housing and the drive coil assembly.
Figure 7:
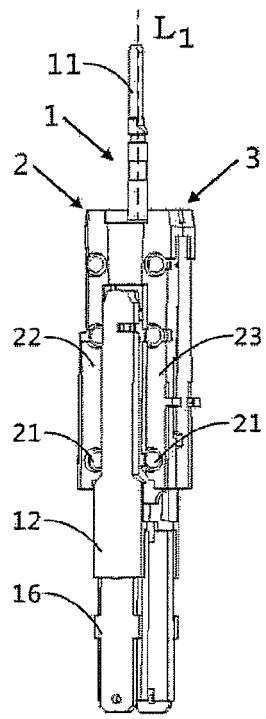
FIG. 7 is a stereogram of the left side of the transducer assembly, which shows a corresponding first mating surface and third mating surface of the handle housing.
Figure 8:
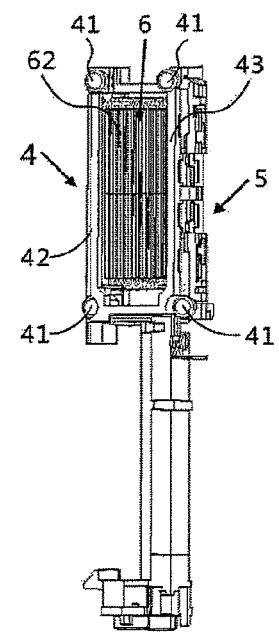
FIG. 8 is a view of the left side of the drive coil assembly, which shows a fifth mating surface and a seventh mating surface of the corresponding handle housing.
Figure 9:
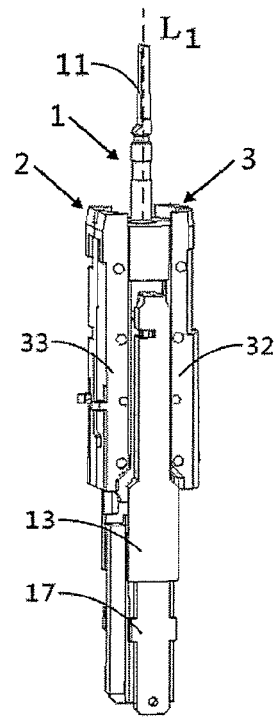
FIG. 9 is a view of the right side of the transducer assembly, which shows a second mating surface and a fourth mating surface of the corresponding handle housing.
Figure 10:
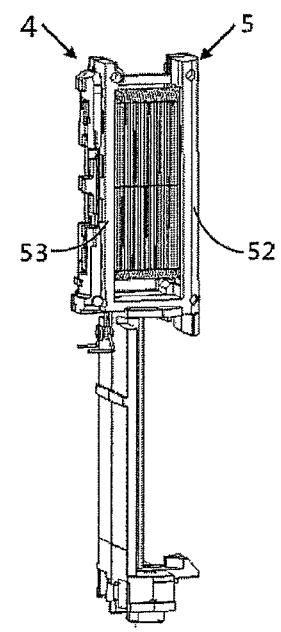
FIG. 10 is a view of the right side of the drive coil assembly, which shows a sixth mating surface and a eighth mating surface of the corresponding handle housing.

As shown in FIG. 6, on the top of the drive coil left frame 4 close to the brush head along the longitudinal axis $L_1$ of the transducer drive shaft are arranged a third mating surface 45 of the drive coil left frame and a fourth mating surface 46 of the drive coil left frame. On the top of the drive coil right frame 5 close to the brush head along the longitudinal axis $L_1$ of the transducer drive shaft are arranged a third mating surface 55 of the drive coil right frame and a fourth mating surface 56 of the drive coil right frame. As shown in FIGS. 1-4, when the drive coil assembly and the transducer assembly are assembled with the handle housing 7, the third mating surface 45 of the drive coil left frame and the third mating surface 25 of the transducer left frame may be in contact facing each other, or also may be separated facing each other. Likewise, the fourth mating surface 46 of the drive coil left frame and the fourth mating surface 26 of the transducer left frame match, the third mating surface 55 of the drive coil right frame and the third mating surface 35 of the transducer right frame match, and the fourth mating surface 56 of the drive coil right frame and the fourth mating surface 36 of the transducer right frame match. Clearly, by the third structural feature part, the transducer assembly and the drive coil assembly may be allowed to be coupled in a way that one can move relative to the other.

With reference to FIG. 2, FIG. 3, and FIGS. 7-10, on the transducer left frame 2 are arranged a first mating surface 22 of the transducer left frame (corresponding to a first mating surface 71 of the handle housing) and a second mating surface 23 of the transducer left frame (corresponding to a third mating surface 73 of the handle housing). The first mating surface 22 of the transducer left frame or the second mating surface 23 of the transducer left frame is distributed around the longitudinal axis $L_1$ of the transducer drive shaft and forms an angle with the longitudinal axis $L_1$ of the transducer drive shaft, the angle is greater than $-45°$ and less than $45°$, preferably, greater than $-5°$ and less than $5°$. On the transducer right frame 3 are arranged a first mating surface 32 of the transducer right frame (corresponding to a second mating surface 72 of the handle housing) and a second mating surface 33 of the transducer right frame (corresponding to a fourth mating surface 74 of the handle housing), and the first mating surface 32 of the transducer right frame and the second mating surface 33 of the transducer right frame are distributed around the longitudinal axis $L_1$ of the transducer drive shaft and form angles with the longitudinal axis $L_1$ of the transducer drive shaft, the angles are greater than $-45°$ and less than $45°$, preferably, greater than $-5°$ and less than $5°$. On the drive coil left frame 4 are arranged a first mating surface 42 of the drive coil left frame (corresponding to a fifth mating surface 75 of the handle housing) and a second mating surface 43 of the drive coil left frame (corresponding to a seventh mating surface 77 of the handle housing), and the first mating surface 42 of the drive coil left frame or the second mating surface 43 of the drive coil left frame is distributed around the longitudinal axis $L_1$ of the transducer drive shaft and forms an angle with the longitudinal axis $L_1$ of the transducer drive shaft, the angle is greater than $-45°$ and less than $45°$, preferably, greater than $-5°$ and less than $5°$. On the drive coil right frame 5 are arranged a first mating surface 52 of the drive coil right frame (corresponding to a sixth mating surface 76 of the handle housing) and a second mating surface 53 of the drive coil right frame (corresponding to an eighth mating surface 78 of the handle housing), and the first mating surface 52 of the drive coil right frame and the second mating surface 53 of the drive coil right frame are distributed around the longitudinal axis L1 of the transducer drive shaft and form angles with the longitudinal axis L1 of the transducer drive shaft, the angles are greater than $-45°$ and less than $45°$, preferably, greater than $-5°$ and less than $5°$.

Figure 11:
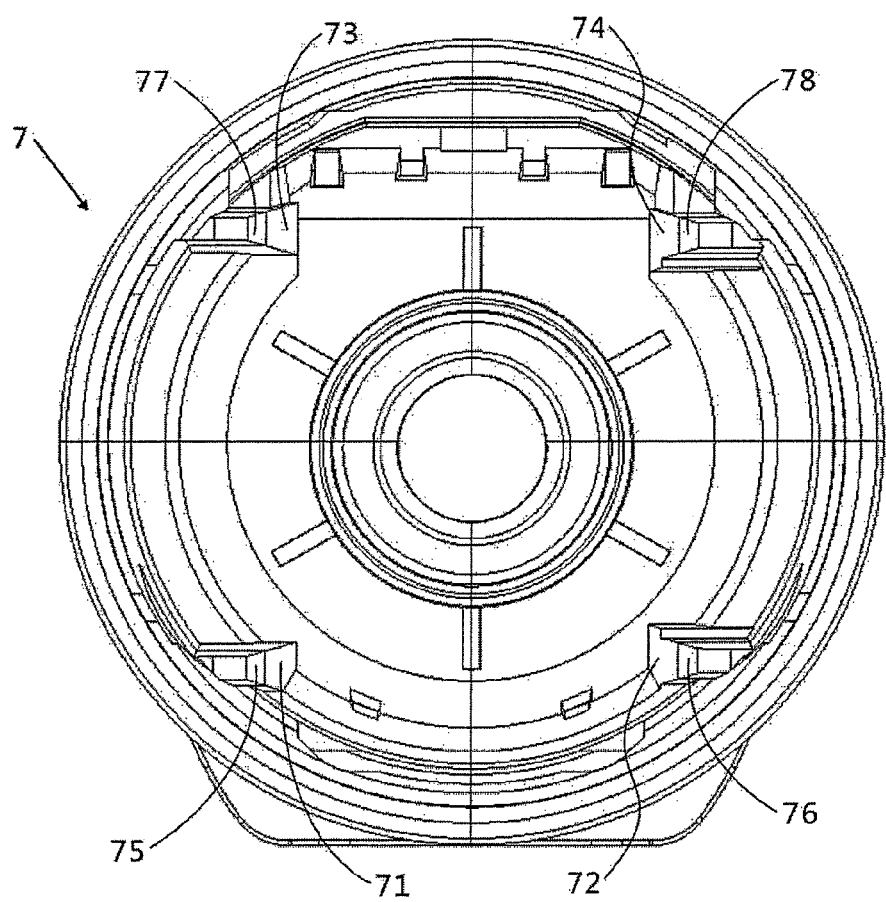
FIG. 11 is a bottom view of the handle housing.

As shown in FIG. 5, FIG. 6, and FIG. 11, on the handle housing 7 along the direction of the longitudinal axis L1 of the transducer drive shaft are arranged eight handle housing mating surfaces, i.e., the first mating surface 71 of the handle housing, the second mating surface 72 of the handle housing, the third mating surface 73 of the handle housing, the fourth mating surface 74 of the handle housing, the fifth mating surface 75 of the handle housing, the sixth mating surface 76 of the handle housing, the seventh mating surface 77 of the handle housing, and the eighth mating surface 78 of the handle housing, respectively. The handle housing mating surfaces 71-78 are distributed around the longitudinal axis L1 of the transducer drive shaft and form angles with the longitudinal axis L1 of the transducer drive shaft, and the angles are greater than −45° and less than 45°, preferably, greater than −5° and less than 5°.

As shown in FIG. 1, FIG. 2, FIG. 5, FIG. 6, and FIG. 11, the first mating surface 71 of the handle housing matches the first mating surface 22 of the transducer left frame, the second mating surface 72 of the handle housing matches the first mating surface 32 of the transducer right frame, the third mating surface 73 of the handle housing matches the second mating surface 23 of the transducer left frame, the fourth mating surface 74 of the handle housing matches the second mating surface 33 of the transducer right frame, the fifth mating surface 75 of the handle housing matches the first mating surface 42 of the drive coil left frame, the sixth mating surface 76 of the handle housing matches the first mating surface 52 of the drive coil right frame, the seventh mating surface 77 of the handle housing matches the second mating surface 43 of the drive coil left frame, and the eighth mating surface 78 of the handle housing matches the second mating surface 53 of the drive coil right frame. The handle housing 7 constrains the mating surfaces that match each other to fit tightly by the mechanical strength of the handle housing 7, causing that the handle housing 7 and the transducer left frame 2 are connected together in a way that one cannot move relative to the other, the handle housing 7 and the transducer right frame 3 are connected together in a way that one cannot move relative to the other, the handle housing 7 and the drive coil left frame 4 are connected together in a way that one cannot move relative to the other, and the handle housing 7 and the drive coil right frame 5 are connected together in a way that one cannot move relative to the other. In summary, the transducer elastic member fixing member 14 and the left and right frames 2, 3 of the transducer are fixed connected via the transducer assembly fixing member 21, and on the transducer left frame 2 and the transducer right frame 3 are respectively arranged the transducer left frame hollow area 24 and the transducer right frame hollow area 34. The transducer left frame hollow area 24 and the transducer right frame hollow area 34 allow a moving component in the transducer 1 to rotate back and forth without interference around the longitudinal axis $L_1$ of the transducer drive shaft or a straight line approximately parallel to the longitudinal axis $L_1$ of the transducer drive shaft in the transducer assembly. The drive coil rack 61 and the left and right frames 4, 5 of the drive coil are fixedly connected via the drive coil assembly fixing member 41. On the drive coil left frame 4 and the drive coil right frame 5 are respectively arranged the drive coil left frame hollow area 44 and the drive coil right frame hollow area 54. The drive coil left frame hollow area 44 and the drive coil right frame hollow area 54 allow a moving component in the transducer 1 to rotate back and forth without interference around the longitudinal axis $L_1$ of the transducer drive shaft or a straight line approximately parallel to the longitudinal axis $L_1$ of the transducer drive shaft in the drive coil assembly. The transducer 1 and the left and right frames 2, 3 of the transducer that are fixedly connected constitute the transducer assembly, the drive coil rack 61 and the left and right frames 4, 5 of the drive coil that are fixedly connected constitute the drive coil assembly, and the drive coil assembly and the transducer assembly are connected in a way that one may move relative to the other. On the transducer left frame 2, the transducer right frame 3 and the drive coil left frame 4 and the drive coil right frame 5 along the longitudinal axis $L_1$ of the transducer drive shaft and around the longitudinal axis $L_1$ of the transducer drive shaft are distributed multiple mating surfaces, for example, eight mating surfaces 22, 23, 32, 33, 42, 43, 52, 53. On the handle housing 7 along the longitudinal axis $L_1$ of the transducer drive shaft and around the longitudinal axis $L_1$ of the transducer drive shaft are respectively arranged multiple mating surfaces, for example, eight mating surfaces 71, 72, 73, 74, 75, 76, 77, 78. The multiple mating surfaces on the handle housing 7, for example, the eight mating surfaces 71, 72, 73, 74, 75, 76, 77, 78, and the corresponding mating surfaces 22, 32, 23, 33, 42, 52, 43, 53 on the transducer assembly and the drive coil assembly mate with each other, such that the handle housing 7 is fastened with the transducer assembly and the drive coil assembly, respectively, and therefore, the handle housing 7 is fixedly connected with the transducer left frame 2, the transducer right frame 3, the transducer elastic member fixing member 14, the drive coil left frame 4, the drive coil right frame 5 and the drive coil rack 61 in a way that one cannot move relative to the other.

In another example of the invention, on the transducer left frame 2 and/or the transducer right frame 3 is arranged only one mating surface around the longitudinal axis $L_1$ of the transducer drive shaft and the one mating surface forms an angle with the longitudinal axis $L_1$ of the transducer drive shaft which is greater than −45° and less than 45°, and on the handle housing 7 is correspondingly arranged one handle housing mating surface which fits tightly with the one mating surface of the transducer left frame and/or the one mating surface of the transducer right frame. Likewise, on the drive coil left frame 4 and/or the drive coil right frame 5 is arranged only one mating surface around the longitudinal axis $L_1$ of the transducer drive shaft and the one mating surface forms an angle with the longitudinal axis $L_1$ of the transducer drive shaft which is greater than −45° and less than 45°, and on the handle housing 7 is correspondingly arranged one handle housing mating surface which tightly fits with the one drive coil left frame mating surface and/or the one drive coil right frame mating surface. Thus, the handle housing 7 may be caused to be connected with the left and right frames 2, 3 of the transducer and the left and right frames 4, 5 of the drive coil in a way that one cannot move relative to the other.

In the following, a dynamic analysis will be conducted.

When the battery placed inside the handle housing 7 applies a current with a frequency of $f_0$ onto the drive coil 6, forces $F_1$, $F_2$ of approximately the same magnitude and opposite directions are generated on the transducer left permanent magnet 18 and the transducer right permanent magnet 19, respectively, under the joint action of the left and right permanent magnets 18 and 19 of the transducer and the powered drive coil 6. By reasonably configuring the transducer 1, for example, reasonably configuring the rotary inertia of the transducer 1 and the transducer elastic member 15, such that the transducer 1 responds to the action of the drive force $F_1$, $F_2$ with the frequency of $f_0$ in a resonance oscillation way, the transducer drive shaft 11 may be caused to rotate back and forth around the longitudinal axis $L_1$ of the transducer drive shaft, and in turn brings the cleaning element on the brush head to rotate back and forth. The forces $F_1$, $F_2$ respectively acting on the transducer left permanent magnet 18 and the transducer right permanent magnet 19 with approximately the same magnitude and opposite directions form a transducer drive torque $M_1$, J is defined as an equivalent rotary inertia of the moving components in the transducer 1 and the brush head, C is defined as an angular acceleration of the moving components in the transducer 1 and the brush head, $M_2$ is defined as a transducer damping torque of the moving components in the transducer 1 and the brush head during motion, and $M_3$ is defined as a transducer elastic torque generated by the transducer elastic member 15. Since the moving components in the transducer 1 and the brush head are in a resonance oscillation state or a resonant vibration state under the action of the transducer drive torque $M_1$ formed by the drive forces $F_1$, $F_2$ with the frequency of $f_0$, it can be seen from the principle of solid mechanics that $M_1 = M_2 + M_3 + CJ$, and since the moving components of the transducer 1 and the brush head are in the resonance oscillation state or the resonant vibration state and $M_1 \approx M_2$, $M_3 \approx -CJ$, that is, the transducer elastic torque $M_3$ and the rotational inertia torque CJ have approximately the same magnitude and opposite directions. According to Newton's third theorem, the transducer elastic member fixing member 14 is subject to an elastic member fixing member torque $M_4$ (FIG. 12) from the transducer elastic member 15. The elastic member fixing member torque $M_4$ and the transducer elastic torque $M_3$ have the same magnitude and opposite directions, and therefore, $M_4 \approx CJ$. In this embodiment, the transducer elastic member fixing member 14 is fixedly connected with the transducer left frame 2 and the transducer right frame 3, and the handle housing 7 fits tightly with the mating surfaces 22, 32, 23, 33 on the left and right frames 2, 3 of the transducer via the mating surfaces 71, 72, 73, 74, respectively, realizing that the handle housing 7 is fixedly connected with the transducer left frame 2 and the transducer right frame 3. Clearly, the handle housing 7 is subject to the action from the elastic member fixing member torque $M_4$.

According to Newton's third theorem, the drive coil 6 is subject to a drive coil torque M5 (FIG. 12), the magnitude of the drive coil torque M5 is the same as the transducer drive torque M1, and the direction of the drive coil torque M5 is opposite to the transducer drive torque M1. In this embodiment, the drive coil rack 61 is fixedly connected with the drive coil left frame 4 and the drive coil right frame 5, and the handle housing 7 fits tightly with the mating surfaces 42, 52, 43, 53 on the left and right frames 4, 5 of the drive coil via the mating surfaces 75, 76, 77, 78, respectively, realizing that the handle housing 7 is fixedly connected with the drive coil left frame 4 and the drive coil right frame 5. Clearly, the handle housing 7 is subject to the action from the drive coil torque $M_5$, wherein $M_5 = -M_1$. The direction of the elastic member fixing member torque $M_4$ is opposite to the direction of the drive coil torque $M_5$.

Figure 12:
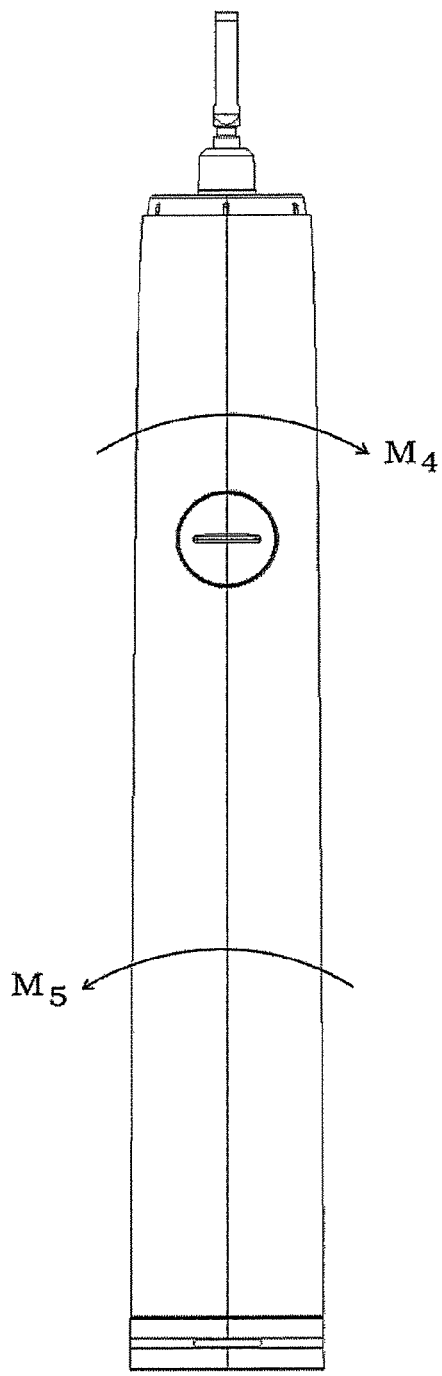
FIG. 12 is a diagram of a torque acting on the handle housing.

As shown in FIG. 12, in this embodiment, the synthetic torque on the handle housing 7 is $M_4 + M_5$, that is, the synthetic torque on the handle housing 7 is about $M_4 + M_5 = CJ - M_1$.

Comparison with a First Comparative Example

In an existing cleaning appliance which utilizes for example a DC permanent magnet micro-motor to drive the brush head, the rotor (equivalent to the transducer assembly in the invention) and the stator (equivalent to the drive coil assembly in the invention) of the DC permanent magnet micro-motor are connected together via the housing case, the synthetic torque on the housing case of the motor is $CJ_{motor}$, and the motor is fixedly connected to the handle housing via a series of structures. Therefore, the handle housing is subject to a torque with the magnitude of $CJ_{motor}$, and $CJ_{motor}$ is related to the output torque of the cleaning appliance. Suppose that the torque of the cleaning appliance of the invention is the same as that of the existing cleaning appliance, namely, $CJ = CJ_{motor}$. Since in the invention the transducer frame for fastening the transducer (1) is inventively divided into the transducer left frame (2) and the transducer right frame (3) which are fixedly connected to be the transducer assembly via the handle housing 7, and the drive coil frame for fastening the drive coil (6) is inventively divided into the drive coil left frame (4) and the drive coil right frame (5) which are fixedly connected to be the drive coil assembly via the handle housing 7, the drive coil assembly and the transducer assembly are connected in a way that one may move relative to the other, so that the synthetic torque on the handle housing 7 of the invention is reduced relative to the synthetic torque on the handle housing of the existing cleaning appliance and the amount of reduction is approximately equal to the transducer damping torque $M_2$, thereby effectively reducing the vibration on the handle housing 7. As described above, in the invention, when a load is applied to the brush head, the synthetic torque on the handle housing 7 is $CJ—M_1$, and at this time, compared with the no load on the brush head, CJ in the synthetic torque on the handle housing 7 becomes smaller, $M_1$ becomes greater, $CJ > M_1$. Therefore, the synthetic torque $CJ - M_1$ when there is a load on the brush head is far less than the synthetic torque when there is no load on the brush head. Yet in the existing cleaning appliance driven by a motor, the amount of reduction of the synthetic torque on the handle housing 7 when a load is applied to the brush head as compared to the synthetic torque on the handle housing 7 when there is no load on the brush head is only the amount of reduction of $CJ_{motor}$. Comparing the conditions in which the same load is applied to the brush heads of the two cleaning appliances and there is no load on their brush heads, it can be seen that the amount of reduction of the synthetic torque of the handle housing 7 in the invention is greater than that of the synthetic torque of the handle housing in the existing cleaning appliance. Therefore, whether there is no load on the brush head or there is a load on the brush head, the synthetic torque on the handle housing 7 of the invention is less than that of the handle housing in the existing cleaning appliance, thereby effectively reducing the vibration on the handle housing 7.

In the invention, the way of connection in which the drive coil assembly and the transducer assembly may move relative to each other may also reduce the vibration of the handle housing 7.

Comparison with a Second Comparative Example

Figure 13:
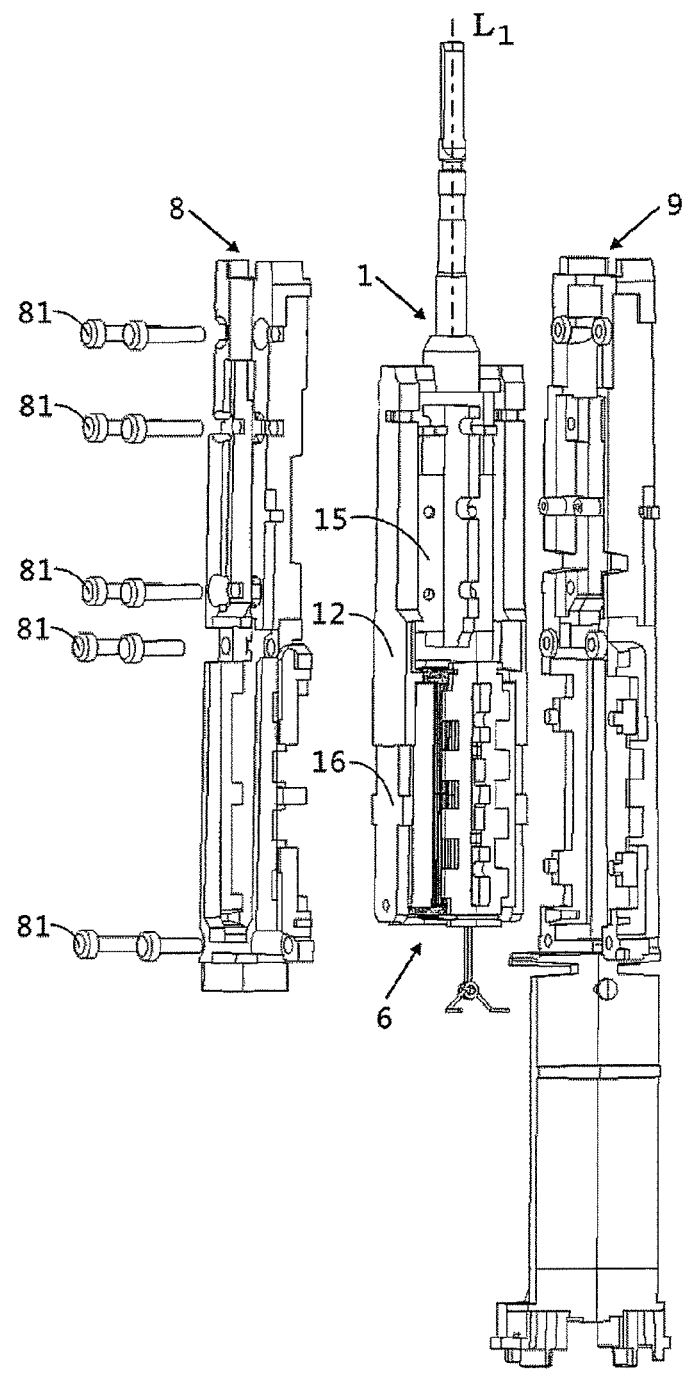
FIG. 13 is a schematic diagram of the second comparative example, which shows an assembly condition of the transducer assembly and the drive coil assembly after the handle housing is removed.
Figure 14:
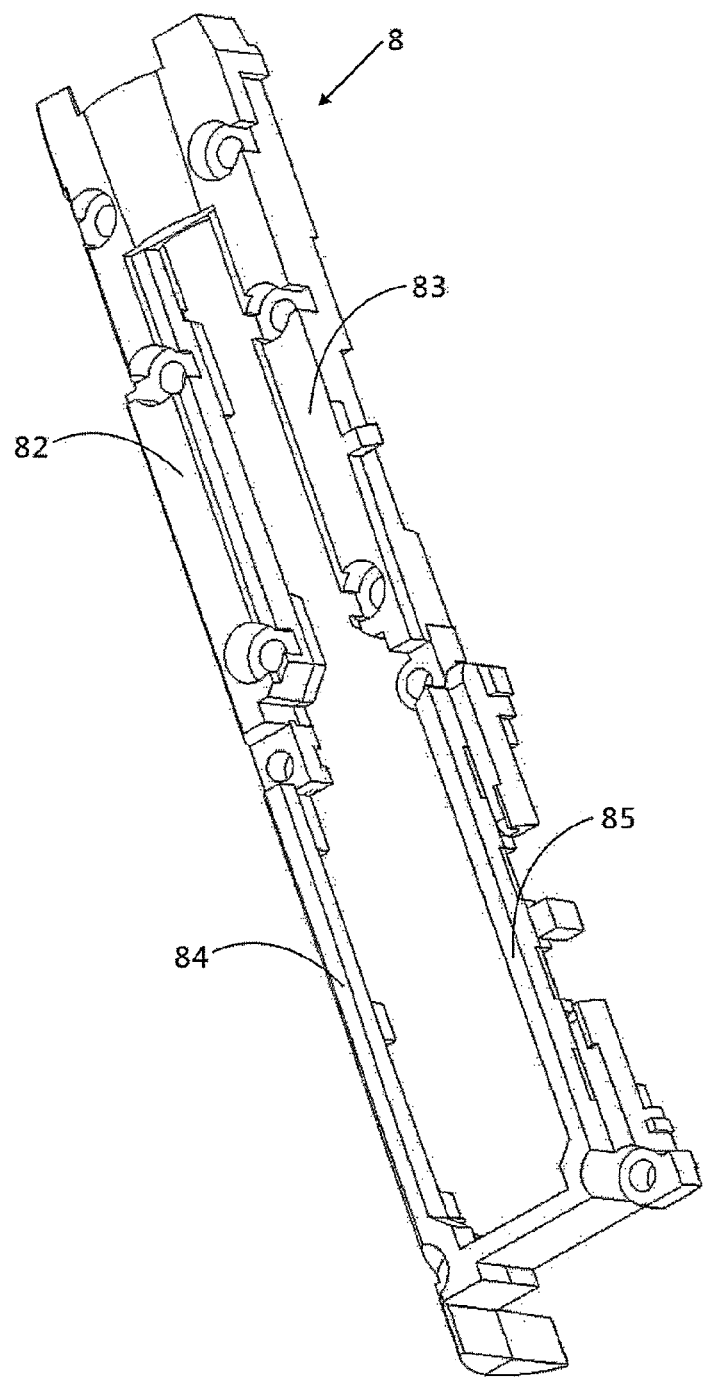
FIG. 14 shows a left frame of the driver apparatus as shown in FIG. 13.
Figure 15:
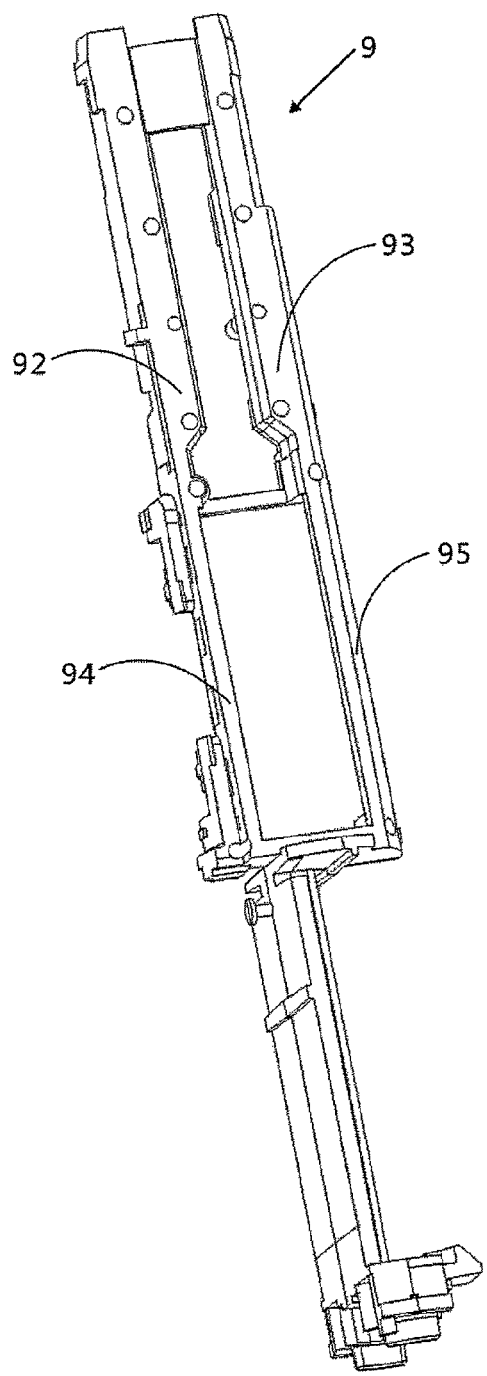
FIG. 15 shows a right frame of the driver apparatus as shown in FIG. 13.

FIGS. 13-15 show a second comparative example (for example, the Chinese patent application No. 201510042433.8). In existing electric cleaning appliances of this type, suppose that the transducer and the drive coil are collectively called a driver apparatus, a structure in which the transducer left frame and the drive coil left frame are fixedly connected together in a way that one cannot move relative to the other or a structure in which the transducer left frame and the drive coil left frame are integrated into a whole body is called a driver apparatus left frame 8, a structure in which the transducer right frame and the drive coil right frame are fixedly connected together in a way that one cannot move relative to the other or a structure in which the transducer right frame and the drive coil right frame are integrated into a whole body is called a driver apparatus right frame 9, and an assembled unit of the driver apparatus left frame 8 and the driver apparatus right frame 9 fastened via a driver apparatus fixing member 81 is defined as a driver apparatus rack. In such a scheme, the handle housing 7 fits tightly with corresponding mating surfaces 82, 93, 83, 92, 84, 95, 85, 94 on the left and right frames 8, 9 of the driver apparatus via the mating surfaces 71, 72, 73, 74, 75, 76, 77, 78, respectively, realizing that the handle housing 7 is fixedly connected with the driver apparatus rack, and the handle housing and the driver apparatus rack are connected together in a way that one cannot move relative to the other. In this comparative example, the first mating surface 82 of the driver apparatus left frame and the third mating surface 84 of the driver apparatus left frame are in the same plane, the second mating surface 83 of the driver apparatus left frame and the fourth mating surface 85 of the driver apparatus left frame are in the same plane, the first mating surface 92 of the driver apparatus right frame and the third mating surface 94 of the driver apparatus right frame are in the same plane, and the second mating surface 93 of the driver apparatus right frame and the fourth mating surface 95 of the driver apparatus right frame are in the same plane. In actual production, if the tight fit area of two parts is large, actually, only multiple points or multiple discrete mating areas fit together tightly, that is, only multiple points or multiple mating areas of the driver apparatus rack are fixed by the handle housing. In general, the driver apparatus rack fixed by the handle housing will produce additional deformation under the action of a static external force or a static external moment of force. According to the principle of solid mechanics, if the same couple of forces is applied to a hollow cuboid or cylinder or torus with the same cross-sectional shape, the torsion angle of the hollow cuboid or cylinder or torus is directly proportional to the length of the hollow cuboid or cylinder or torus in the direction of the vector of the couple of forces. That is, the greater the length of the hollow cuboid or cylinder or torus in the direction of the vector of the couple of forces, the larger the torsion angle is. Clearly, under the same static external couple of forces, the larger the torsion angle of the hollow cuboid or cylinder or torus is, the larger the amplitude of the vibration thereof is, and also the larger the amplitude of the vibration transferred by the hollow cuboid or cylinder or torus to their respective fixing member is.

In the invention, the transducer 1 is in a resonance oscillation state under the action of the alternating transducer drive torque $M_1$ with the frequency of $f_0$. In embodiments of the invention, the shapes of the drive coil rack and the transducer rack are similar to the driver apparatus rack in the second comparative example, roughly a hollow cuboid, and clearly, the drive coil rack, the transducer rack, the driver apparatus rack in the embodiments of the invention and the second comparative example are subject to the action of the alternating torque with the frequency of $f_0$. The drive coil rack comprises fixedly connected drive coil left frame 4 and drive coil right frame 5, and the drive coil rack is used for fixing the drive coil 6, such that the drive coil 6 will not generate a displacement when subject to the action of an alternating external force and/or external couple of forces. According to the principle of solid mechanics, in order to cause the drive coil rack not to be in the resonance oscillation state under the action of an alternating external force and/or external couple of forces, so as to reliably fixing the drive coil 6, the natural frequency of the drive coil rack should be far greater than the frequency of the alternating external force and/or external couple of forces. The closer the natural frequency of the drive coil rack is to the frequency of the alternating external force and/or external couple of forces, the larger the magnification factor of the amplitude of the dynamic force of the drive coil rack with respect to the amplitude of the static force is, and when a resonant vibration occurs, the magnification factor of the amplitude of the dynamic force of the drive coil rack with respect to the amplitude of the static force reaches the maximum. According to the principle of solid mechanics, when the shape of the cross section of the drive coil rack perpendicular to the longitudinal axis $L_1$ of the transducer drive shaft is almost unchanged, the shorter the length of the drive coil rack in the direction of the vector of the couple of forces, the larger the natural frequency of the drive coil rack is. In the embodiments of the invention, the direction of the vector of the main couple of forces applied to the drive coil rack is approximately parallel to the longitudinal axis $L_1$ of the transducer drive shaft, and therefore, the shorter the length of the drive coil rack along the direction of the longitudinal axis $L_1$ of the transducer drive shaft, the greater the natural frequency of the drive coil rack is, and in turn, the smaller the magnification which is the ratio of the amplitude of the dynamic force to the amplitude of the static force on the drive coil rack is. Nevertheless, the smaller the amplitude of the dynamic force of the drive coil rack, the smaller the amplitude of the dynamic force on the handle housing 7 also is.

Likewise, in the embodiment, when the shape of the cross section of the transducer rack perpendicular to the longitudinal axis $L_1$ of the transducer drive shaft is almost unchanged, the shorter the length of the transducer rack along the direction of the longitudinal axis $L_1$ of the drive shaft, the larger the natural frequency of the transducer rack is, and the smaller the magnification which is the ratio of the amplitude of the dynamic force to the amplitude of the static force on the transducer rack is. Nevertheless, the smaller the amplitude of the dynamic force of the transducer rack, the smaller the amplitude of the dynamic force on the handle housing 7 also is.

In the invention, the direction of the vector of the dynamic couple of forces applied to the driver apparatus rack or the transducer rack or the drive coil rack is substantially parallel to the longitudinal axis $L_1$ of the transducer drive shaft, and the angle between the direction of the vector of the dynamic couple of forces and the longitudinal axis $L_1$ of the transducer drive shaft is between −10° and 10°, preferably 0°.

In the invention, the drive coil assembly and the transducer assembly are connected in a way that one may move relative to the other, the drive coil assembly and the transducer assembly are similar to a hollow cuboid, but the length of the drive coil assembly or the transducer assembly in the direction of the vector of the couple of forces is less than that of the drive coil assembly and the transducer assembly which are fixedly connected together (namely, the structure of the second comparative example) in the direction of the vector of the couple of forces, and therefore, under the action of the same alternating couple of forces, the vibration amplitude of the drive coil assembly or the transducer assembly is much less than that of the drive coil assembly and the transducer assembly which are fixedly connected together (the driver apparatus rack), so that the vibration amplitude of the handle housing is also small. Therefore, the invention inventively introduces the drive coil assembly and the transducer assembly which are connected in a way that one may move relative to the other, and introduces that the handle housing is fixedly connected with the drive coil assembly, and the handle housing is fixedly connected with the transducer assembly, which may thus effectively reduce the vibration of the handle housing.

Obviously, what is described above is just exemplary, many variations and modifications may further be made by the skilled in the art without departing from the scope of the invention defined by the claims, and these variations and modifications should fall within the scope of the invention defined by the claims.

For example, the transducer in the invention is not restricted to the structure described above. The transducer may comprise at least one permanent magnet having different magnetic poles on the same end face at the same time.

In addition, it may also be possible that the transducer elastic member fixing member and the left and right frames of the transducer are fixed connected by employing other approaches (e.g., bonding, ultrasonic welding, etc.) and/or by the transducer assembly fixing member, the drive coil rack and the left and right frames of the drive coil are fixed connected by employing other approaches (e.g., bonding, ultrasonic welding, etc.) and/or by the drive coil assembly fixing member, and the drive coil and the left and right frames of the drive coil are fixed connected by employing other approaches (e.g., bonding, ultrasonic welding, etc.) and/or by the drive coil assembly fixing member, or the like.

The mating surfaces may be any shape suitable for tight fit, preferably a plane.

It is especially advantageous to apply the invention to the appliances for personal cleaning and care of the type disclosed by the invention patent application No. 201510042433.8 filed by the applicant.

What is claimed is:

1. A fixing structure for use in a driver apparatus of an electric cleaning appliance, the electric cleaning appliance comprises a handle housing (7) and a driver apparatus placed inside the handle housing (7), the driver apparatus comprises a transducer assembly and a drive coil assembly, the transducer assembly comprises a transducer, a transducer frame and a transducer assembly fixing part, the drive coil assembly comprises a drive coil, a drive coil frame and a drive coil assembly fixing part, the transducer (1) comprises a transducer drive shaft (11) inserted into a cleaning assembly, at least one transducer elastic member (15), at least one transducer elastic member fixing member (14) for fastening the transducer elastic member (15) and at least two permanent magnets (18, 19), the polarities of the magnetic poles of the permanent magnets (18, 19) in a direction toward the drive coil (6) are opposite, the permanent magnets (18, 19) are movable either relative to the transducer elastic member fixing member (14) or relative to the drive coil (6), and when an alternating current with a frequency of $f_0$ passes through the drive coil (6), an electromagnetic force generated between the permanent magnets (18, 19) and the drive coil (6) drives the transducer (1) to resonate, wherein the transducer frame comprises a transducer left frame (2) and a transducer right frame (3) which are formed separately from each other, the transducer (1) is fixedly connected with the transducer left frame (2) and the transducer right frame (3), the drive coil frame comprises a drive coil left frame (4) and a drive coil right frame (5) which are formed separately from each other, the drive coil (6) is fixedly connected with the drive coil left frame (4) and the drive coil right frame (5), on the drive coil left frame (4) and the drive coil right frame (5) are respectively arranged a drive coil left frame hollow area (44) and a drive coil right frame hollow area (54), the drive coil left frame hollow area (44) and the drive coil right frame hollow area (54) allow a moving component in the transducer (1) to rotate back and forth without interference around the longitudinal axis ($L_1$) of the transducer drive shaft or a straight line approximately parallel to the longitudinal axis ($L_1$) of the transducer drive shaft in the drive coil assembly; wherein the handle housing (7) is fastened with the transducer assembly via a first structural feature part in a way that one is not movable relative to the other, the handle housing (7) is fastened with the drive coil assembly via a second structural feature part in a way that one is not movable relative to the other; and wherein the transducer assembly and the drive coil assembly are connected via a third structural feature part in a way that one is movable relative to the other, in contact facing each other or separately.

2. The fixing structure as claimed in claim 1, wherein the first structural feature part is at least one mating surface which is respectively disposed on the transducer left frame (2) or the transducer right frame (3) and forms an angle with the longitudinal axis ($L_1$) of the transducer drive shaft, and mating surfaces correspondingly disposed on the handle housing (7) along the direction of the longitudinal axis ($L_1$) of the transducer drive shaft and mating therewith.

3. The fixing structure as claimed in claim 2, wherein the angle is greater than 0° and less than 45°.

4. The fixing structure as claimed in claim 3, wherein the angle is greater than 0° and less than 5°.

5. The fixing structure as claimed in claim 2, wherein the at least one mating surface and the mating surfaces mating therewith are planes.

6. The fixing structure as claimed in claim 2, wherein the transducer left frame (2) and the transducer right frame (3) are disposed symmetrically and separately.

7. The fixing structure as claimed in claim 2, wherein the drive coil left frame (4) and the drive coil right frame (5) are disposed symmetrically and separately.

8. The fixing structure as claimed in claim 1, wherein the second structural feature part is at least one mating surface which is respectively disposed on the drive coil left frame (4) or the drive coil right frame (5) and forms an angle with the longitudinal axis ($L_1$) of the transducer drive shaft, and mating surfaces correspondingly disposed on the handle housing (7) along the direction of the longitudinal axis ($L_1$) of the transducer drive shaft and mating therewith.

9. The fixing structure as claimed in claim 8, wherein the at least one mating surface and the mating surfaces mating therewith are planes.

10. The fixing structure as claimed in claim 8, wherein the transducer left frame (2) and the transducer right frame (3) are disposed symmetrically and separately.

11. The fixing structure as claimed in claim 8, wherein the drive coil left frame (4) and the drive coil right frame (5) are disposed symmetrically and separately.

12. The fixing structure as claimed in claim 8, wherein the angle is greater than 0° and less than 45°.

13. The fixing structure as claimed in claim 1, wherein the third structural feature part is at least one mating surface (45, 46, 55, 56) which is respectively arranged facing the top of the brush head along the longitudinal axis ($L_1$) of the transducer drive shaft on the drive coil left frame (4) and the drive coil right frame (5), and mating surfaces (25, 26, 35, 36) disposed on the transducer left frame (2) and the transducer right frame (3) and mating therewith.

14. The fixing structure as claimed in claim 13, wherein the at least one mating surface and the mating surfaces mating therewith are planes.

15. The fixing structure as claimed in claim 13, wherein the transducer left frame (2) and the transducer right frame (3) are disposed symmetrically and separately.

16. The fixing structure as claimed in claim 13, wherein the drive coil left frame (4) and the drive coil right frame (5) are disposed symmetrically and separately.

17. The fixing structure as claimed in claim 1, wherein the transducer left frame (2) and the transducer right frame (3) are disposed symmetrically and separately.

18. The fixing structure as claimed in claim 1, wherein the drive coil left frame (4) and the drive coil right frame (5) are disposed symmetrically and separately.

19. The fixing structure as claimed in claim 1, wherein the first structural feature part is mating surfaces which are respectively disposed on the transducer left frame (2) and the transducer right frame (3) and form an angle with the longitudinal axis ($L_1$) of the transducer drive shaft, and mating surfaces correspondingly disposed on the handle housing (7) along the direction of the longitudinal axis ($L_1$) of the transducer drive shaft and mating therewith.

20. The fixing structure as claimed in claim 1, wherein the second structural feature part is mating surfaces which are respectively disposed on the drive coil left frame (4) and the drive coil right frame (5) and form an angle with the longitudinal axis ($L_1$) of the transducer drive shaft, and mating surfaces correspondingly disposed on the handle housing (7) along the direction of the longitudinal axis ($L_1$) of the transducer drive shaft and mating therewith.

* * * * *